United States Patent
Murakami

(10) Patent No.: US 8,475,877 B2
(45) Date of Patent: Jul. 2, 2013

(54) METHOD FOR COUNTERACTING CURLING TENDENCY OF GAS BARRIER FILM, METHOD FOR PRODUCING GAS BARRIER FILM, AND METHOD FOR PRODUCING ELECTRONIC DEVICE

(75) Inventor: Tomoo Murakami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 500 days.

(21) Appl. No.: 12/876,457

(22) Filed: Sep. 7, 2010

(65) Prior Publication Data
US 2011/0056608 A1 Mar. 10, 2011

(30) Foreign Application Priority Data
Sep. 8, 2009 (JP) ................................. 2009-207281

(51) Int. Cl.
*B05D 3/02* (2006.01)

(52) U.S. Cl.
USPC ......... 427/372.2; 427/58; 427/66; 427/207.1; 428/212; 428/214; 428/411.1

(58) Field of Classification Search
USPC ................ 427/58, 66, 207.1, 372.2; 428/212, 428/214, 411.1
See application file for complete search history.

(56) References Cited

U.S. PATENT DOCUMENTS

| 5,325,144 A * | 6/1994 | Yoshikawa et al. ........... 396/612 |
| 2007/0026168 A1* | 2/2007 | Kishimoto et al. ............ 428/1.6 |
| 2009/0196998 A1 | 8/2009 | Nakagame et al. |
| 2009/0214882 A1* | 8/2009 | Sakakura ..................... 428/447 |

FOREIGN PATENT DOCUMENTS

| JP | 5-127822 A | 5/1993 |
| JP | 6-64145 A | 3/1994 |
| JP | 10-512104 A | 11/1998 |
| JP | 2001-226009 A | 8/2001 |
| JP | 2002-48913 A | 2/2002 |
| JP | 2007-30387 A | 2/2007 |
| JP | 2009-21554 A | 1/2009 |
| JP | 2009-94051 A | 4/2009 |
| JP | 2009-172993 A | 8/2009 |
| JP | 2009-179853 A | 8/2009 |
| WO | WO 97/15947 A1 | 5/1997 |

\* cited by examiner

*Primary Examiner* — Nathan Empie
*Assistant Examiner* — Xiao Zhao
(74) *Attorney, Agent, or Firm* — Birch, Stewart, Kolasch & Birch, LLP

(57) ABSTRACT

A method for counteracting the curling tendency of a gas barrier film having a tendency to curl up with a support side thereof facing inside, comprising (1) heating the gas barrier film from the support side thereof to thereby control the support temperature to fall between Tg and Tg+40° C., and (2) conveying the film in the roller circumferential direction within one second after the temperature of the support has reached Tg, while a part of the gas barrier layer of the gas barrier film is kept in contact with a film surface center part noncontact roller wherein Tg means the glass transition temperature of the support.

20 Claims, 2 Drawing Sheets

Apparatus 1

Apparatus 1

(1) Apparatus 2

(2) Apparatus 3

(3) Apparatus 4

METHOD FOR COUNTERACTING CURLING TENDENCY OF GAS BARRIER FILM, METHOD FOR PRODUCING GAS BARRIER FILM, AND METHOD FOR PRODUCING ELECTRONIC DEVICE

CROSS-REFERENCE TO RELATED APPLICATIONS

The present application claims the benefit of priority from Japanese Patent Application No. 207281/2009, filed on Sep. 8, 2009, the contents of which are herein incorporated by reference in their entirety.

BACKGROUND OF THE INVENTION

1. Field of the Invention

The present invention relates to a method for counteracting the curling tendency of gas barrier film, and to a method for producing a gas barrier film that includes the method for counteracting the curling tendency of gas barrier film. The invention also relates to a gas barrier film to which is applied the method for counteracting the curling tendency of gas barrier film, and to a method for producing an electronic device that comprises using the gas barrier film produced according to the method for producing gas barrier film.

2. Description of the Related Art

It is known that when a rolled film or sheet is stored as such, it will gain a tendency to curl up. The rolled film or sheet thus having the curling tendency will still keep its curling tendency even after cut, therefore bringing about a problem in that the transferability and the pileup capability of the cut films or sheets would worsen. Some methods have heretofore been known for counteracting the curling tendency of such films and sheets thus having gained the tendency to curl up, for example, as in JP-A 2001-226009 and 6-64145.

JP-A 2001-226009 discloses a method for counteracting the curling tendency of roll paper of a rolled sheet by the use of a hot roller, wherein the heating temperature of the hot roller and the lapping time of the sheet around the peripheral surface of the hot roller are specifically defined, based on the curling information of the sheet.

However, the reference does not concretely disclose the temperature at which the rolled sheet is heated, and in addition, in this, the curling tendency of the rolled sheet is counteracted by lapping it around the hot roller in the same direction as the curling direction of the sheet, and therefore, the curling tendency counteracting effect is insufficient. Further, according to the method described in the reference, the entire surface of the rolled sheet is kept in close contact with the peripheral surface of the hot roller for counteracting the curling tendency of the sheet, and therefore, according to the constitution of the apparatus described in the reference, the roll for rewinding up the sheet therearound in the direction to the side opposite to the side thereof heated by the hot roller is located considerably posteriorly from the hot roller. Therefore, according to the curling tendency counteracting method, the sheet, after heated, shall take a long period of time before it is rewound up in the direction to the side opposite to the heated side thereof.

JP-A 6-64145 discloses a method for counteracting the curling tendency of an original fabric not damaging the surface of the fabric, wherein a small-diameter roller is used as a curling tendency-counteracting roller and wherein the roller is heated up to a temperature corresponding to the winding core diameter of the feed roll from which the original fabric is fed and then the original fabric is wound around the roller under tension in the direction opposite to the winding direction around the feed roll. This reference discloses that the optimum heating temperature in the case where the winding core of the feed roll is 200 mm is incidentally 80° C. that corresponds to the glass transition temperature of polyethylene terephthalate of the original fabric.

However, this reference discloses that, for feed rolls having a different winding core diameter, the optimum heating temperature is lower than the glass transition temperature of the original fabric, but this does not suggest that heating the original fabric up to a temperature not lower than the glass transition temperature thereof would be preferable. In addition, in this reference, the curling tendency counteracting roller is kept in close contact with the entire surface of the original fabric for counteracting the curling tendency of the fabric.

On the other hand, regarding a gas barrier film having a gas barrier layer, when a gas barrier film having gained a tendency to curl up is cut as such into a sheet and when the sheet is stuck to the substrate having electronic elements mounted thereon, then the curling level of the sheet resulting from the curling tendency thereof is often problematic. Concretely, when electronic elements are sealed up with a gas barrier film, then there may occur a problem in that the gas barrier film itself could not adhere to the substrate, or there may occur a trouble in that the gas barrier film stuck to the substrate would peel away from the substrate with time. Regarding the gas barrier film, the adhesiveness thereof to the substrate may have a direct influence on the gas barrier property of the film, and therefore, the above problems are more serious than those of the curling tendency of other ordinary films.

Recently, the application of gas barrier film to organic EL displays and others is expanding, and it is desired to produce a large amount of more powerful gas barrier film according to a more simplified production method. From this viewpoint, a method is desired for counteracting the curling tendency of gas barrier film within a short period of time not worsening the gas barrier property thereof.

For counteracting the curling tendency of gas barrier film, the present inventors investigated the methods described in JP-A 2001-226009 and 6-64145 and have found that these methods are unsuitable to the case of counteracting the curling tendency of gas barrier film. Concretely, according to the method described in JP-A 2001-226009, the preset temperature range is unclear and, in addition, there still remains a problem in that the curling tendency of the sheet could not be sufficiently counteracted within a short period of time since the sheet is wound around the hot roller for counteracting the curling tendency of the sheet on the side of the support thereof. On the other hand, it has been known that, when the method described in JP-A 6-64145 is applied to a gas barrier film, then the entire surface of the gas barrier film is inevitably kept in direct contact with the curling tendency-counteracting roller therefore resulting in that the gas barrier film may be scratched and the gas barrier property of the film may be worsened. In addition, it has been known that the heating temperature described in that reference is unsatisfactory from the viewpoint of counteracting the curling tendency of the film within a short period of time.

SUMMARY OF THE INVENTION

An object of the invention is to solve the above-mentioned problems.

Specifically, the object of the invention is to provide a method for counteracting the curling tendency of gas barrier film within a short period of time not worsening the gas barrier property of the film.

The present inventors have assiduously studied for the purpose of solving the above-mentioned problems and, as a result, have found that, as a roller for counteracting the curling tendency of a film with the support side of the film kept facing inside the roller, when a film surface center part noncontact roller is used for preventing the gas barrier layer from being deteriorated or scratched, and when the film is conveyed in the roller circumferential direction while the heating temperature of the support is controlled to fall within a specific range and while a part of the gas barrier layer of the gas barrier film is kept in contact with the film surface enter part noncontact roller, within a specific period of time after the temperature of the support has reached Tg, then the curling tendency of the film can be noticeably counteracted within a short period of time, and have completed the present invention. Specifically, the above-mentioned problems can be solved by the constitution of the invention described below.

[1] A method for counteracting the curling tendency of a gas barrier film which comprises a support formed of a thermoplastic resin, and a gas barrier layer comprising at least one organic layer and at least one inorganic layer and which has a tendency to curl up with the support side thereof facing inside; the method comprising:

heating the gas barrier film from the support side thereof to thereby control the support temperature to fall between Tg and Tg+40° C., and conveying the film in the roller circumferential direction within one second after the temperature of the support has reached Tg, while a part of the gas barrier layer of the gas barrier film is kept in contact with a film surface center part noncontact roller wherein Tg means the glass transition temperature of the support and the same shall apply hereinunder.

[2] The method for counteracting the curling tendency of a gas barrier film of [1], wherein the gas barrier film has a structure of at least one organic layer and at least one inorganic layer alternately laminated on one surface of the support.

[3] The method for counteracting the curling tendency of a gas barrier film of [1], wherein the gas barrier film has an organic layer, an inorganic layer and another organic layer laminated in this order on one surface of the support.

[4] The method for counteracting the curling tendency of a gas barrier film of any one of [1] to [3], wherein the support is formed of a polyethylene naphthalate.

[5] The method for counteracting the curling tendency of a gas barrier film of any one of [1] to [4], wherein the gas barrier film having the curling tendency is a rolled gas barrier film as wound up with its support side facing inside.

[6] The method for counteracting the curling tendency of a gas barrier film of any one of [1] to [5], wherein the gas barrier film is conveyed at a traveling speed of 2 to 15 m/min.

[7] The method for counteracting the curling tendency of a gas barrier film of anyone of [1] to [6], wherein the support temperature is controlled to fall between Tg+10° C. and Tg+30° C.

[8] The method for counteracting the curling tendency of a gas barrier film of any one of [1] to [7], wherein controlling the temperature of the support of the gas barrier film is attained by the use of a noncontact-type heating means.

[9] The method for counteracting the curling tendency of a gas barrier film of [8], wherein the gas barrier film is heated from the support side by an induction heating method.

[10] The method for counteracting the curling tendency of a gas barrier film of [9], wherein the gas barrier film is heated by applying hot air of a heater to the support side of the film.

[11] The method for counteracting the curling tendency of a gas barrier film of any one of [1] to [10], wherein the gas barrier film is conveyed in the roller circumferential direction within the range of from 0.1 to 0.5 seconds after the temperature of the support has reached Tg.

[12] The method for counteracting the curling tendency of a gas barrier film of any one of [1] to [11], wherein the gas barrier film is conveyed in the roller circumferential direction over from 1/8 to 1/2 of the overall circumferential length of the roller while a part of the gas barrier layer of the film is kept in contact with the film surface center part noncontact roller.

[13] The method for counteracting the curling tendency of a gas barrier film of [12], wherein the gas barrier film is conveyed in the roller circumferential direction over from 1/6.5 to 1/2.3 of the overall circumferential length of the roller.

[14] The method for counteracting the curling tendency of a gas barrier film of any one of [1] to [13], wherein the film surface center part noncontact roller has a diameter of from 30 to 300 mm.

[15] The method for counteracting the curling tendency of a gas barrier film of any one of [1] to [14], wherein the gas barrier layer gets in contact with the film surface center part noncontact roller in the site parallel to the gas barrier film traveling direction.

[16] The method for counteracting the curling tendency of a gas barrier film of any one of [1] to [14], wherein the gas barrier film is a rectangular sheet and both sides of the gas barrier layer of the gas barrier film get in contact with the film surface center part noncontact roller.

[17] A method for producing a gas barrier film, comprising carrying out the method of any one of [1] to [16] and continuously forming an adhesive layer on the gas barrier film without winding up.

[18] The method for producing a gas barrier film of [17], wherein the adhesive layer is formed on the gas barrier film by coating a composition for the adhesive layer.

[19] A method for producing an electronic device, comprising sealing up electronic elements by the use of the gas barrier film treated by the method of any one of [1] to [16] or the gas barrier film produced by the method of [17] or [18].

[20] The method for producing an electronic device of [19], wherein the electronic device is an organic EL device.

According to the invention, the curling tendency of a gas barrier film can be counteracted within a short period of time not deteriorating the gas barrier property of the film.

Counteracting the curling tendency of a gas barrier film to thereby flatten the film may facilitate adhesion of the film to an electronic element such as organic EL panel or the like to thereby better the sealability of the element with the film. In addition, counteracting the curling tendency of a gas barrier film to thereby flatten the film may reduce the pressure necessary for adhering the film to an electronic element such as an organic EL panel or the like, and therefore the gas barrier film is not deteriorated so much. From these results, the life of the organic EL display device can be prolonged.

Figure 1:
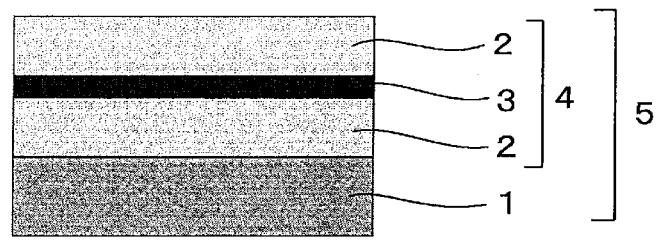
FIG. 1 is a schematic view showing a typical constitution of a gas barrier film to be treated according to the invention.

In the drawings, 1 is a support, 2 is an organic layer, 3 is an inorganic layer, 4 is a gas barrier layer, 5 is a gas barrier film, 6 is a heating means, and 7 is a film surface center part noncontact roller.

BEST MODE FOR CARRYING OUT THE INVENTION

The invention is described in more detail hereinunder. In this description, the numerical range expressed by the wording "a number to another number" means the range that falls between the former number indicating the lowermost limit of the range and the latter number indicating the uppermost limit thereof. In the invention, "organic EL element" means organic electroluminescent element.

[Method for Counteracting Curling Tendency of Gas Barrier Film]

The method for counteracting the curling tendency of a gas barrier film of the invention is a method for counteracting the curling tendency of a gas barrier film which comprises a support formed of a thermoplastic resin, and a gas barrier layer including at least one organic layer and at least one inorganic layer and which has a tendency to curl up with the support side thereof facing inside; and the method comprises a step of heating the gas barrier film from the support side thereof to thereby control the support temperature to fall between Tg and Tg+40° C., and a step of conveying the film in the roller circumferential direction within one second after the temperature of the support has reached Tg, while a part of the gas barrier layer of the gas barrier film is kept in contact with a film surface center part noncontact roller. The method for counteracting the curling tendency of a gas barrier film of the invention is described in detail hereinunder.

(Gas Barrier Film)

The gas barrier film in the invention comprises a support formed of a thermoplastic resin such as polyethylene naphthalate (PEN) and polyethylene terephthalate (PET), and a gas barrier layer including at least one organic layer and at least one inorganic layer, and this has a tendency to curl up with the support side thereof facing inside.

In the method of the invention, the gas barrier film preferably has a structure of at least one organic layer and at least one inorganic layer alternately laminated on one surface of the support. Also preferably, the gas barrier layer of the gas barrier film may have any other organic layer. A preferred typical embodiment of the gas barrier film is shown in FIG. 1.

The gas barrier film in the invention may be constituted according to the description in JP-A 2009-94051, paragraphs [0011] to [0030].

In the method of the invention, the gas barrier film has a tendency to curl up with the support side thereof facing inside. In this description, the "curling tendency" means that, when a rolled film is unrolled, the film still remains to curl but is not restored to the original flat condition.

Figure 2:
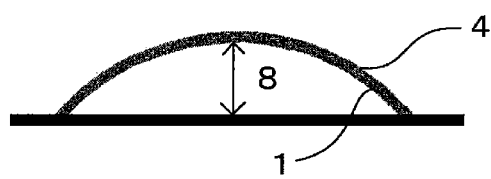
FIG. 2 is a schematic view showing the site for measurement of the curling level in the invention.

The intensity of the curling tendency may be evaluated by quantitatively measuring the curling level. In this description, the curling level means as follows: When a film is cut into a A4 size and when it is put on a flatbed, the curling height from the flatbed is the curling level of the film. FIG. 2 is a schematic view showing a method of measuring the curling level of a film.

The curling level can be measured with a vernier caliper. A plus value of the curling level means that the film has curled concavely with its barrier layer side facing upward; and a minus value of the curling level means that the film has curled convexly with its barrier layer side facing upward.

The gas barrier film to be treated according to the method of the invention may be any one of which the tendency to curl up with its support side facing inside is to be counteracted. A gas barrier film once wound up into a roll may be directly treated according to the method of the invention; or a gas barrier film once wound up into a roll may be unrolled (that is, spread into a film) and then treated according to the method of the invention.

In the method of the invention, the gas barrier film is preferably wound up into a roll with its support side kept facing inside, as the process for the film of the time can be more simplified. In case where a gas barrier film is wound up into a roll and stored as such, in general, the film is wound up with its support side kept facing inside, from the viewpoint of maintaining the barrier property of the film.

(Heating Step)

The method for counteracting the curling tendency of a gas barrier film of the invention includes a step of heating the gas barrier film from the support side thereof to thereby control the support temperature to fall between Tg and Tg+40° C. Controlling the temperature of the support of the gas barrier film to fall between Tg and Tg+40° C. in that manner provides an advantage in that that the curling tendency of the film can be counteracted within a short period of time.

Preferably, the temperature of the support is controlled to fall between Tg+5° C. and Tg+35° C., more preferably between Tg+10° C. and Tg+30° C.

In the method for counteracting the curling tendency of a gas barrier film of the invention, preferably, the step of controlling the temperature of the support of the gas barrier film is attained by the use of a noncontact-type heating means from the viewpoint that a part of the gas barrier layer of the gas barrier film can be more readily kept in contact with the film surface center part noncontact roller within one second after the temperature of the support has reached Tg.

For controlling the temperature of the support of the gas barrier film by the use of a noncontact-type heating means, for example, there may be mentioned a resistance heating method of applying hot air to the film by the use of a heater, as well as an IR heating method, an induction heating method, etc. In the invention, a resistance heating method is employed.

(Step of Contacting Film with Film Surface Center Part Noncontact Roller)

The method for counteracting the curling tendency of a gas barrier film of the invention includes a step of conveying the film in the roller circumferential direction within one second after the temperature of the support has reached Tg, while a part of the gas barrier layer of the gas barrier film is kept in contact with a film surface center part noncontact roller. In the method, the step where the gas barrier film is conveyed in the roller circumferential direction within one second after the temperature of the support of the film has reached Tg, while a part of the gas barrier layer of the film is kept in contact with a film surface center part noncontact roller provides an advantage in that that the curling tendency of the film can be counteracted within a short period of time. A case where the temperature of the support of the gas barrier film reaches Tg at the same time when a part of the gas barrier layer of the gas barrier film has been brought into contact with the film surface center part noncontact roller is not within the scope of the invention.

The time until a part of the gas barrier layer of the gas barrier film can be brought into contact with the film surface center part noncontact roller after the temperature of the support of the gas barrier film has reached Tg thereof is preferably within a range of from 0.1 to 0.7 seconds, more preferably from 0.1 to 0.5 seconds. The gas barrier film is preferably conveyed at a traveling speed of 2 to 15 m/min, more preferably 4 to 13 m/min.

In this description, the film surface center part noncontact roller is so designed that the center part of the roller to face the barrier layer side of a gas barrier film is not in contact with the film but the edges thereof are in contact with the film; and this may be referred to step roller or a stepped roller. In the method of the invention, a roller of the type is used, and therefore, a part of the gas barrier layer formed on the opposite side to the support of the gas barrier film is kept in contact with the roller and the entire gas barrier layer of the film can be prevented from being damaged or scratched.

Not contradictory to the scope and the spirit of the invention, the film surface center part noncontact roller for use in the invention is not specifically defined, and for example, the stepped roller described in JP-A 2009-179853 may be used here.

The part of the gas barrier layer to be kept in contact with the film surface center part noncontact roller is preferably in the site parallel to the gas barrier film traveling direction; and more preferably, the part is both sides (right margin and left margin) of the film when the gas barrier film is conveyed as a sheet (rectangular sheet), from the viewpoint that the area of the gas barrier layer to be kept in contact with the film surface center part noncontact roller is small.

Preferably, the method for counteracting the curling tendency of a gas barrier film of the invention includes a step of conveying the gas barrier film in the roller circumferential direction over from $1/6$ to less than $1/2$ of the overall circumferential length of the roller while a part of the gas barrier layer of the film is kept in contact with the film surface center part noncontact roller, from the viewpoint of sufficiently counteracting the curling tendency. The length for which the curling tendency-having gas barrier film is conveyed in the roller circumferential direction while the film is kept in contact with the film surface center part noncontact roller is preferably from $1/8$ to $1/2$ of the overall circumferential length of the roller, more preferably from $1/6.5$ to $1/2.3$ of the overall circumferential length of the roller, still more preferably from $1/5$ to $1/2.5$ of the overall circumferential length of the roller, even more preferably from $1/4$ to less than $1/3$ of the overall circumferential length of the roller. In this specification, the rate of the length for which the gas barrier film is conveyed in the roller circumferential direction while the film is kept in contact with the film surface center part noncontact roller, to the overall circumferential length of the roller is referred to as wrapping angle (see Table 1 below). The roller used in the invention preferably has a diameter of from 30 to 300 mm, more preferably from 45 to 210 mm.

Preferably, after treated according to the method of counteracting the curling tendency of the invention, the gas barrier film is, without being wound up, continuously processed for forming an adhesive layer thereon.

The gas barrier film thus treated according to the method of the invention for counteracting the curling tendency of the gas barrier film, which has become free from the curling tendency, may be continuously stuck to any other part directly as it is, or may be rewound up for a period of time within which the curling tendency would not again occur in the film, and then it may be used.

[Method for Producing Gas Barrier Film]

The method for producing a gas barrier film of the invention comprises forming an adhesive layer on a gas barrier film continuously and without winding up the gas barrier film after the curling tendency counteracting method of the invention. Forming an adhesive layer on a gas barrier film continuously and without winding up the gas barrier film after the curling tendency counteracting method of the invention provides an advantage in that the process may be shortened and the film may be prevented from being damaged or scratched to degrade the barrier property thereof.

The adhesive includes a heat seal adhesive, a thermal adhesive, a pressure-sensitive adhesive, a photosensitive adhesive, etc. The adhesive layer in the invention is for adhering the support and the gas barrier layer to an object to which the sheet is adhered (for example, electronic device panel).

[Method for Producing Electronic Device]

The method for producing an electronic device of the invention includes a step of sealing up electronic elements by the use of the gas barrier film treated according to the method for counteracting the curling tendency of gas barrier film of the invention or the gas barrier film produced according to the production method for gas barrier film of the invention.

(Electronic Device)

The electronic device of the invention includes an organic EL device, a liquid-crystal display device, a thin-film transistor, a touch panel, an electronic paper, a solar cell, etc.

The electronic device of the invention is meant to indicate a device capable of expressing or outputting light emission, electric resistance value change, color change, molecular alignment change or the like by inputting an electric change through voltage application or the like to the device, or a device capable of expressing or outputting an electric change such as power generation, electric resistance value change or the like by inputting to the device an environmental change through photoirradiation, energy ray irradiation, pressure application, heat application or the like. Preferably, the production method for electronic device of the invention is applied to an electronic device panel including electronic elements that may degrade with time through exposure to water, oxygen, etc. One preferred example of the electronic device of the invention is concretely a photoelectric conversion device, more preferably a light emitting device or an electric power generating device, even more preferably an organic EL device, a liquid-crystal display device, a solar cell, an electronic paper, a display panel, a touch panel, etc. Apart from the photoelectric conversion device, the electronic device of the invention includes, for example, a thin-film transistor, etc.

(Organic EL Device)

In the invention, the electronic device is more preferably an organic EL device.

Examples of an organic EL device that has a gas barrier film are described in detail in JP-A 2007-30387.

(Liquid-Crystal Display Device)

For the liquid-crystal display device of the invention, reference may be made to the description of the paragraph [0044] in JP-A 2009-172993.

(Solar Cell)

The gas barrier film of the invention may be used as a sealing film for solar cell elements. Preferably, the gas barrier film of the invention is used for sealing up solar cell elements with its adhesive layer kept adjacent to the elements. Not specifically defined, the solar cell structure to which the gas barrier film of the invention is favorably used includes, for example, a monocrystalline silicon-based solar cell device, a polycrystalline silicon-based solar cell device, a single junction-type or tandem structure-type amorphous silicon-based solar cell device, a III-V Group compound semiconductor solar cell device such as gallium-arsenic (GaAs), indium-phosphorus (InP) or the like solar cell device, a II-VI Group compound semiconductor solar cell device such as cadmium-tellurium (CdTe) or the like solar cell device, a I-III-IV Group compound semiconductor solar cell device such as copper/indium/selenium (so-called CIS-based), copper/indium/gallium/selenium (so-called CIGS-based), copper/indium/gallium/selenium/sulfur (so-called CIGSS-based) or the like solar cell device, a dye-sensitized solar cell device, an organic solar cell device, etc. Above all, in the invention, the solar cell device is preferably a I-III-IV Group compound semiconductor solar cell device such as copper/indium/selenium (so-called CIS-based), copper/indium/gallium/selenium (so-called CIGS-based), copper/indium/gallium/selenium/sulfur (so-called CIGSS-based) or the like solar cell device.

[Electronic Paper]

The gas barrier film of the invention is applicable to electronic paper. Electronic paper is a reflection-type electronic display and can realize a high definition and a high contrast ratio.

Electronic paper has, on the substrate thereof, a display medium and TFT for driving the display medium. The display medium may be any known conventional display medium. The display medium favorable to the invention may be any of an electrophoresis-based system, an electronic powder and granular material flying system, a charge toner system, an electrochromic system or the like; and more preferred is an electrophoresis-based system display medium. In particular, a microcapsule-type electrophoresis-based system display medium is preferred in the invention. The electrophoresis-based system display medium comprises plural capsules in which all the plural capsules each contain at least one particle movable in a suspension fluid. At least one particle is preferably an electrophoretic particle or a rotary ball. The electrophoresis-based system display medium comprises a first face and a second face opposite the first face, and this displays a visible image via one face of the first and second faces.

TFT arranged on the substrate comprises at least a gate electrode, a gate insulating layer, an active layer, a source electrode and a drain electrode, further having a resistance layer that electrically connects to at least one of between the active layer and the source electrode or between the active electrode and the drain electrode. The electronic paper produces light shading through voltage application thereto.

When a high-definition color-displaying electronic display device is produced, preferably, TFT is formed on the color filter therein for securing the alignment accuracy. However, even though ordinary TFT having a low current efficiency is used for obtaining the necessary drive current, the downsizing of the device is limited, and therefore the area of TFT in the pixel shall increase owing to the increased high-definition performance of the display device. Increase in the area of TFT in a pixel reduces the aperture ratio and reduces the contrast ratio. Accordingly, even though a transparent amorphous IGZO-type TFT is used, the light transmittance could not be 100% and the reduction in the contrast ratio is inevitable. In that situation, for example, TFT described in JP-A 2009-21554 is used to reduce the area for TFT in the pixel, thereby increasing the aperture ratio and the contrast ratio. When TFT of the type is directly formed on a color filter, then the device may attain high-definition display.

(Others)

Other application examples are thin-film transistors as in JP-T 10-512104, touch panels as in JP-A 5-127822 and 2002-48913, etc.

EXAMPLES

The present invention will be further specifically explained with reference to the following examples of the present invention. The materials, amounts, ratios, types and procedures of treatments and so forth shown in the following examples can be suitably changed unless such changes depart from the gist of the present invention. Accordingly, the scope of the present invention should not be construed as limited to the following specific examples.

Production Example 1

Production of Gas Barrier Film

With reference to the description of the paragraphs [0050] to [0058] in JP-A 2009-94051, a PEN film having a thickness of 100 μm was used as a support, and a gas barrier layer was formed thereon comprising 0.5 μm of an organic layer, 50 nm of an inorganic layer and 0.5 μm of an organic layer laminated in that order, thereby producing a gas barrier film. The PEN film used here had Tg of 120° C.

Winding and Storage of Gas Barrier Film:

The produced gas barrier film was wound up for a length of 300 m with its support side kept inside.

Subsequently, this was stored in an environment at 25° C. for 30 days.

Example 1

Method for Counteracting Curling Tendency of Gas Barrier Film

Figure 3:
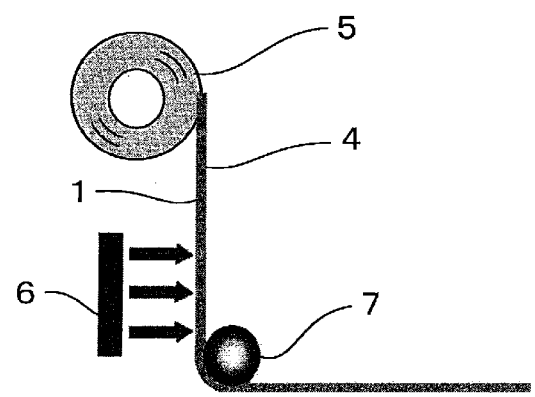
FIG. 3 is a schematic view showing the position at which the temperature of the support of a gas barrier film is controlled in the method for counteracting the curling tendency of a gas barrier film of the invention.

The stored gas barrier film roll was treated with the curling tendency counteracting apparatus having the constitution shown in FIG. 3, in which the film was wound around the film surface center part noncontact roller in the direction opposite to the direction of the curling tendency that the film had gained during storage, thereby counteracting the curling tendency of the film.

The film surface center part noncontact roller in the apparatus of FIG. 3 had a diameter of 100 mm. A resistance heating method was employed as the heating means, and the gas barrier film was heated from the support side thereof whereby the support temperature was controlled as in Table 1 below. The film traveling speed was 5 m/min. The temperature of the support was measured with an IR radiation temperature meter. The gas barrier film was so conveyed in the roller direction that it could be kept in contact with film surface center part noncontact roller for a length thereof of somewhat longer by about ¼ of the overall peripheral length of the film surface center part noncontact roller. The time taken until the contact of the film with the film surface center part noncontact roller after the support temperature had reached Tg is shown in Table 1 below.

(Formation of Adhesive Layer)

The gas barrier film of which the curling tendency had been counteracted was not rewound up, and an adhesive layer was continuously formed on the gas barrier film. Concretely, an adhesive (Daizo Nichimori's trade name, Epotec 310) was applied onto the gas barrier film to thereby form an adhesive layer thereon.

(Production of Organic EL Device)

According to the description of the paragraph [0059] in JP-A 2009-94051, an organic EL device (unsealed) of Sample No. 212 of the paragraph [0063] in the reference was produced.

The gas barrier film of which the curling tendency had been counteracted and on which an adhesive layer had been formed in Example 1 was stuck to the organic EL device, and cured under heat at 65° C. for 3 hours.

(Measurement of Curling Level)

The film of which the curling tendency had been counteracted according to the method of Example 1 was taken out of the line before formation of an adhesive film thereon, and its curling level was measured with a vernier caliper. The results are shown in Table 1 below. The range of from −10 mm to 10 mm is practical and the range of from −5 mm to 5 mm is preferable.

(Measurement of Water Vapor Permeability (Barrier Property) According to MOCON Method)

Using a water vapor permeability measuring apparatus (MOCON's PERMATRAN-W3/31), the water vapor permeability of the film was measured at 40° C. and a relative humidity of 90%, and the results are shown in Table 1 below. The detection limit in this measurement is 0.005 g/m²/day.

A: Less than 0.005 g/m²/day.
B: 0.005 g/m²/day or more.

Examples 2 and 3

Comparative Examples 1, 3 and 4

These Examples and Comparative Examples are the same as Example 1 except that the heating means therein was modified so as to change the support temperature as in Table 1 below.

Comparative Example 2

In Comparative Example 2, the stored gas barrier film roll was unwound, without leading it to pass through the curling tendency counteracting apparatus and without heating it.

Comparative Example 5

Comparative Example 5 is the same as Example 1 except that a film surface contract roller (whole surface contact roller) was sued in place of the film surface center part noncontact roller.

Comparative Examples 6 to 8

Figure 4:
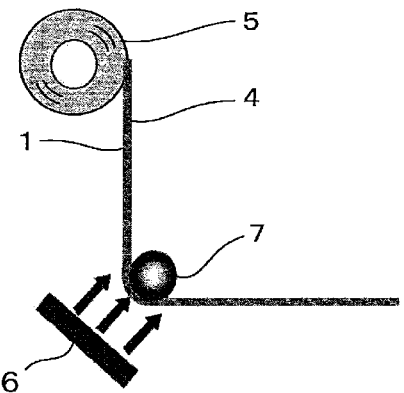
FIG. 4 shows schematic views of the methods for counteracting the curling tendency of a gas barrier film in Comparative Examples.
Figure 4:
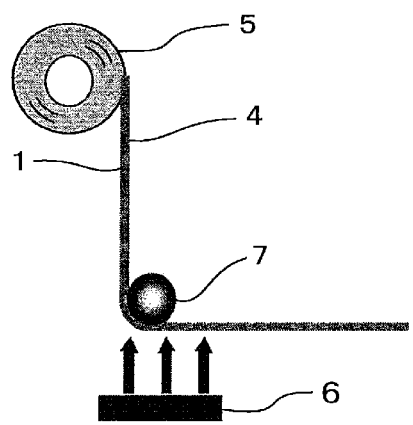
Figure 4:
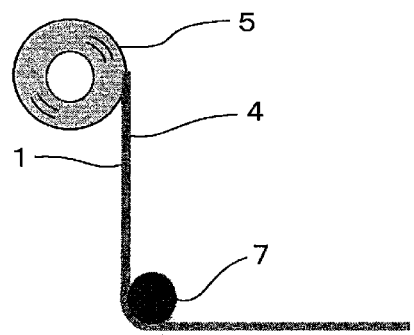

Comparative Examples 6 to 8 are the same as Example 1 except that the curing tendency counteracting apparatus 1 having the constitution shown in FIG. 3 was changed to the apparatus 2 to 4 shown in FIG. 4(1) to FIG. 4(3), respectively. It was confirmed that, in the apparatus 2 to 4 used in Comparative Examples 6 to 8, the time when the support temperature reached Tg or higher was not before the contact of the film the film surface center part noncontact roller, or that is, the time was after the contact of the film with the film surface center part noncontact roller. The time taken until the support temperature reached Tg or higher after contact of the film with the film surface center part noncontact roller was measured, and the found data are shown in Table 1 below with "minus" given thereto in the column of Comparative Examples 6 to 8. In FIG. 4(1) and FIG. 4(2), the arrows indicate the position mainly heated by the heating means; and in FIG. 4(3), the film surface center part noncontact roller itself was heated so as to heat the gas barrier film from the side opposite to the support side thereof.

Examples 4 and 5

And Comparative Example 9

These Examples and Comparative Example are the same as Example 1 except that the traveling speed therein was modified so as to change the traveling speed as in Table 1 below.

Example 6

This Example is the same as Example 3 except that the traveling speed therein was modified so as to change the traveling speed as in Table 1 below.

Examples 7, 9 and 10

These Examples are the same as Example 1 except that the diameter of the film surface center part noncontact roller therein was modified so as to change the diameter as in Table 1 below.

Example 8

This Example is the same as Example 4 except that the diameter of the film surface center part noncontact roller therein was modified so as to change the diameter as in Table 1 below.

Examples 11 to 14

These Examples are the same as Example 1 except that the wrapping angle therein was modified so as to change the wrapping angle as in Table 1 below.

TABLE 1

|  | Film Surface Center Part Noncontact Roller | Support Temperature (° C.) | Traveling Speed (m/min) | Constitution of Curling Tendency Counteracting Apparatus | Diameter of Film Surface Center Part Noncontact Roller (mm) |
| --- | --- | --- | --- | --- | --- |
| Example 1 | yes | 120 | 5 | Apparatus 1 | 100 |
| Example 2 | yes | 140 | 5 | Apparatus 1 | 100 |
| Example 3 | yes | 160 | 5 | Apparatus 1 | 100 |
| Comparative Example 1 | yes | 180 | 5 | Apparatus 1 | 100 |
| Comparative Example 2 | no (no roller) | — | — | no | — |
| Comparative Example 3 | yes | 110 | 5 | Apparatus 1 | 100 |
| Comparative Example 4 | yes | room temperature | 5 | Apparatus 1 | 100 |
| Comparative Example 5 | no (whole surface contact roller) | 120 | 5 | Apparatus 1 | 100 |

TABLE 1-continued

| Example | | | | | | Wrapping Angle | Time taken from after reaching Support Temperature Tg to before contact with Film Surface Center Part Noncontact Roller (sec) | Curling Level (mm) | Evaluation of Gas Barrier Property |
|---|---|---|---|---|---|---|---|---|---|
| Example 1 | | | | | | 1/4 | 0.3 | −5 | A |
| Example 2 | | | | | | 1/4 | 0.3 | 0 | A |
| Example 3 | | | | | | 1/4 | 0.3 | 5 | A |
| Comparative Example 1 | | | | | | 1/4 | 0.3 | 20 | A |
| Comparative Example 2 | | | | | | — | — | −50 | A |
| Comparative Example 3 | | | | | | 1/4 | 0.3 | −10 | A |
| Comparative Example 4 | | | | | | 1/4 | 0.3 | −45 | A |
| Comparative Example 5 | | | | | | 1/4 | 0.3 | −5 | B |
| Comparative Example 6 | yes | 120 | 5 | Apparatus 2 | 100 | 1/4 | −0.5 | −10 | A |
| Comparative Example 7 | yes | 120 | 5 | Apparatus 3 | 100 | 1/4 | −1 | −30 | A |
| Comparative Example 8 | yes | 120 | 5 | Apparatus 4 | 100 | 1/4 | −0.5 | −10 | A |
| Comparative Example 9 | yes | 120 | 2.5 | Apparatus 1 | 100 | 1/4 | 2 | −10 | A |
| Example 4 | yes | 120 | 3 | Apparatus 1 | 100 | 1/4 | 0.7 | −5 | A |
| Example 5 | yes | 120 | 10 | Apparatus 1 | 100 | 1/4 | 0.1 | 3 | A |
| Example 6 | yes | 160 | 12 | Apparatus 1 | 100 | 1/4 | 0.08 | 7 | A |
| Example 7 | yes | 120 | 5 | Apparatus 1 | 50 | 1/4 | 0.3 | −5 | A |
| Example 8 | yes | 120 | 3 | Apparatus 1 | 40 | 1/4 | 0.3 | −7 | A |
| Example 9 | yes | 120 | 5 | Apparatus 1 | 200 | 1/4 | 0.3 | −5 | A |
| Example 10 | yes | 120 | 5 | Apparatus 1 | 220 | 1/4 | 0.3 | −7 | A |
| Example 11 | yes | 120 | 5 | Apparatus 1 | 100 | 1/6 | 0.3 | −5 | A |
| Example 12 | yes | 120 | 5 | Apparatus 1 | 100 | 1/7 | 0.3 | −7 | A |
| Example 13 | yes | 120 | 5 | Apparatus 1 | 100 | 1/2.5 | 0.3 | 5 | A |
| Example 14 | yes | 120 | 5 | Apparatus 1 | 100 | 1/2 | 0.3 | 7 | A |

From Table 1, it is known that, when the results in Examples are compared with those in Comparative Examples, the curling tendency of the gas barrier film can be counteracted within a short period of time without deteriorating the gas barrier property thereof, according to the method of the invention.

In Comparative Example 5, the gas barrier layer had large scratches seen in visual check.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 207281/2009, filed on Sep. 8, 2009, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for counteracting the curling tendency of a gas barrier film which comprises a support formed of a thermoplastic resin, and a gas barrier layer comprising at least one organic layer and at least one inorganic layer and which has a tendency to curl up with the support side thereof facing inside; the method comprising:

heating the gas barrier film from the support side thereof to thereby control the support temperature to fall between Tg and Tg+40° C., and conveying the film in the roller circumferential direction within one second after the temperature of the support has reached Tg, while a part of the gas barrier layer of the gas barrier film is kept in contact with a film surface center part noncontact roller wherein Tg means the glass transition temperature of the support.

2. The method for counteracting the curling tendency of a gas barrier film according to claim 1, wherein the gas barrier film has a structure of at least one organic layer and at least one inorganic layer alternately laminated on one surface of the support.

3. The method for counteracting the curling tendency of a gas barrier film according to claim 1, wherein the gas barrier film has an organic layer, an inorganic layer and another organic layer laminated in this order on one surface of the support.

4. The method for counteracting the curling tendency of a gas barrier film according to claim 1, wherein the support is formed of a polyethylene naphthalate.

5. The method for counteracting the curling tendency of a gas barrier film according to claim 1, wherein the gas barrier film having the curling tendency is a rolled gas barrier film as wound up with its support side facing inside.

6. The method for counteracting the curling tendency of a gas barrier film according to claim 1, wherein the gas barrier film is conveyed at a traveling speed of 2 to 15 m/min.

7. The method for counteracting the curling tendency of a gas barrier film according to claim 1, wherein the support temperature is controlled to fall between Tg+10° C. and Tg+30° C.

8. The method for counteracting the curling tendency of a gas barrier film according to claim 1, wherein controlling the temperature of the support of the gas barrier film is attained by the use of a noncontact-type heating means.

9. The method for counteracting the curling tendency of a gas barrier film according to claim 1, wherein the gas barrier film is heated from the support side by an induction heating method.

10. The method for counteracting the curling tendency of a gas barrier film according to claim 9, wherein the gas barrier film is heated by applying hot air of a heater to the support side of the film.

11. The method for counteracting the curling tendency of a gas barrier film according to claim 1, wherein the gas barrier film is conveyed in the roller circumferential direction within the range of from 0.1 to 0.5 seconds after the temperature of the support has reached Tg.

12. The method for counteracting the curling tendency of a gas barrier film according to claim 1, wherein the gas barrier film is conveyed in the roller circumferential direction over from $1/8$ to $1/2$ of the overall circumferential length of the roller while a part of the gas barrier layer of the film is kept in contact with the film surface center part noncontact roller.

13. The method for counteracting the curling tendency of a gas barrier film according to claim 12, wherein the gas barrier film is conveyed in the roller circumferential direction over from $1/6.5$ to $1/2.3$ of the overall circumferential length of the roller.

14. The method for counteracting the curling tendency of a gas barrier film according to claim 1, wherein the film surface center part noncontact roller has a diameter of from 30 to 300 mm.

15. The method for counteracting the curling tendency of a gas barrier film according to claim 1, wherein the gas barrier layer gets in contact with the film surface center part noncontact roller in the site parallel to the gas barrier film traveling direction.

16. The method for counteracting the curling tendency of a gas barrier film according to claim 1, wherein the gas barrier film is a rectangular sheet and both sides of the gas barrier layer of the gas barrier film get in contact with the film surface center part noncontact roller.

17. A method for producing a gas barrier film with an adhesive layer comprising:

heating a gas barrier film which comprises a support formed of a thermoplastic resin, and a gas barrier layer comprising at least one organic layer and at least one inorganic layer and which has a tendency to curl up with the support side thereof facing inside, from the support side thereof to thereby control the support temperature to fall between Tg and Tg+40° C., conveying the film in the roller circumferential direction within one second after the temperature of the support has reached Tg, while a part of the gas barrier layer of the gas barrier film is kept in contact with a film surface center part noncontact roller wherein Tg means the glass transition temperature of the support, and and continuously forming an adhesive layer on the gas barrier film without winding up.

18. The method for producing a gas barrier film according to claim 17, wherein the adhesive layer is formed on the gas barrier film by coating a composition for the adhesive layer.

19. A method for producing an electronic device, comprising sealing up electronic elements by the use of a film obtained by:

heating a gas barrier film which comprises a support formed of a thermoplastic resin, and a gas barrier layer comprising at least one organic layer and at least one inorganic layer and which has a tendency to curl up with the support side thereof facing inside, from the support side thereof to thereby control the support temperature to fall between Tg and Tg+40° C., and conveying the film in the roller circumferential direction within one second after the temperature of the support has reached Tg, while a part of the gas barrier layer of the gas barrier film is kept in contact with a film surface center part noncontact roller wherein Tg means the glass transition temperature of the support.

20. The method for producing an electronic device according to claim 19, wherein the electronic device is an organic EL device.

* * * * *